Nov. 13, 1928.
G. H. FLODIN
1,691,272
METHOD OF PRODUCING METALS AND METAL ALLOYS LOW IN CARBON
Filed March 18, 1924
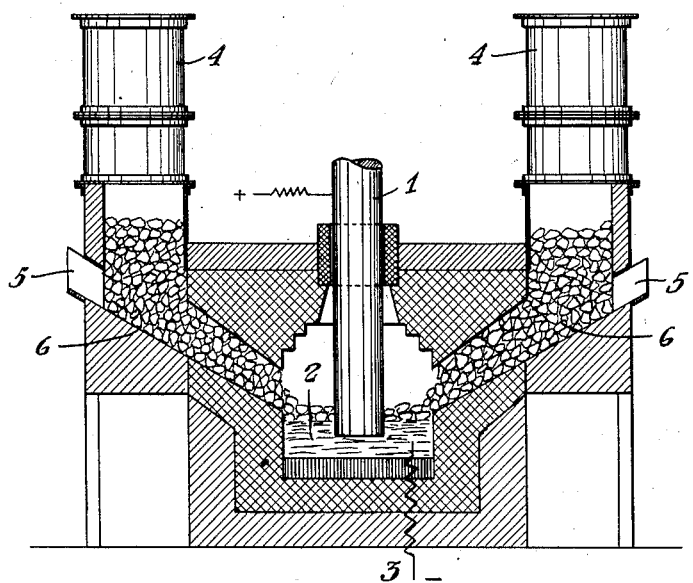
Inventor
G. H. Flodin
By Marks & Clerk
attys.

Patented Nov. 13, 1928.

1,691,272

UNITED STATES PATENT OFFICE.

GUSTAV HENNING FLODIN, OF ROSLAGS-NASBY, SWEDEN.

METHOD OF PRODUCING METALS AND METAL ALLOYS LOW IN CARBON.

Application filed March 18, 1924, Serial No. 700,162, and in Sweden April 20, 1923.

The present invention refers to an improved method of producing metals and metal alloys low in carbon with carbon or carbonaceous material as reducing agent alone or, if desired, together with another reducing agent.

The principal object of the invention is to provide a method of the type described according to which metals or metal alloys may be produced having a low percentage of carbon that can be exactly determinated in advance.

To this end the method according to the invention comprises preparing a mixture of finely divided metal ore and finely divided carbonaceous material of such a quantity that the entire quantity of carbon is practically consumed on reduction, transforming said mixture into briquettes so as to bring the substances that are to chemically act upon each other into intimate contact with one another and to prevent the formation of local excesses of the one or other substance, and reducing and melting said briquettes in an electric electrode furnace in which heat is developed by electric resistance in the slag bath with the briquettes floating on the slag bath.

When, for instance, a ferro-chromium alloy is to be produced, chromic ore, carbonaceous material and, if desired, other reducing agents and fluxing materials are used as raw materials, a suitable quantity of iron ore being added, if the percentage of iron of the chromic ore is not sufficient to produce a ferro-chromium alloy of common percentage of iron.

It is a principal feature of the present invention that the briquettes are reduced and melted while swimming or floating on the top of the slag bath formed in the furnace during the melting process, it being of greatest importance that the briquettes do not sink down below the surface of the slag, as otherwise they would easily fall to pieces during the reduction which would cause destruction of the mutual contact between the ore and carbon particles whereby the low percentage of carbon aimed at would not be obtained. To prevent the briquettes from sinking underneath the surface of the slag bath it is preferred to adapt their specific weight in such manner that it will be lower than that of the slag formed during the melting process. This can be effected by suitably adapting the composition of the briquettes or the degree of pressing to which they are subjected. To further ensure that the briquettes are prevented from sinking underneath the surface of the slag bath, they are preferably composed in such manner that the slag formed in melting attains a suitable degree of toughness so that the passage of the briquettes through the layer of slag will be impeded. The choice of the substances that are to be used for this purpose in each particular case depends, of course, on the composition of the ore and on the nature of the carbonaceous material as well as of the nature of the other reducing agents, if any, but lime, dolomite, quartz, sand, materials rich in alumina or the like may be cited as examples.

In order to more effectively prevent the production of local excesses, especially of carbon, the same is mixed into the charging materials, wholly or partly in the form of liquid substances such as molasses, sulphite waste liquor, tar or the like, whereby a distribution as uniform as possible of the carbonaceous substance within the briquettes, and simultaneously a perfect binding of the materials therein are obtained. It is, however, of the utmost importance, in order to attain a really low percentage of carbon in the final metal or metal alloy, that the liquid carbonaceous substance is in such condition that on pressing the mixture into briquettes it shows no tendency to uneven separation from the other materials, for instance by accumulating toward the surfaces of the briquettes.

For this purpose according to the present invention, the carbonaceous material mixed into the other charging material is supplied in such condition as to be in a solid state at ordinary temperature, but in a doughy or semi-liquid state at the temperature at which the briquetting is to take place.

The advantage of using the carbon in this form for attaining a distribution as uniform as possible and an intimate contact with the other materials of the briquettes is obvious. As all constituents are in a solid state at ordinary temperature, it is very easy to effect a thorough mixing between such carbonaceous substance finely divided and the other raw materials required for the desired composition of the metal or metal alloy respectively. In heating the mixture either prior to or during the pressing thereof into briquettes, or in both of these stages, and in pressing the said mixture into such briquettes, the carbonaceous substance which is now in a doughy or semi-liquid state may be brought into contact as intimately as possible with the other raw materials, the same covering the other grains of material in the form of a film, without in any way being subjected to a local displacement relatively to the said grains of material.

As examples of suitable carbon having the above-mentioned properties, pitch, asphalt, liquid carbonaceous substance such as sulphite waste liquor, molasses and others, evaporated to a nearly dry state, may be mentioned, which substances may be readily powdered at ordinary temperature, provided the degree of dryness is the proper one.

It is also possible, however, to admix with the other finely powdered raw materials, liquid carbonaceous substance from the beginning, which substance may be in liquid form only at a certain temperature, and to also obtain the desired exceedingly intimate mixture, if the process is carried out as follows: The mixture of the liquid carbonaceous substance and the other raw materials is subjected to a drying process carried out so far that the viscosity of the carbonaceous material is increased so that the same is prevented, on the subsequent briquetting, from local displacement relatively to the other grains of material, the same only covering the latter in the form of a film.

In the drying process it may easily occur, particularly so if substances other than water also escape from the materials, that an alteration is caused in the concentration of the carbonaceous substance in the various parts of the mixture. In such a case it is preferred, in order to increase the uniformity of distribution of the carbonaceous substance in the material prior to charging the furnace employed, to subject the mixture to another powdering or fine-crushing process combined with thorough mixing, before the pressing of the mixture into briquettes is effected. In this treatment, the drying must be carried to such an extent as to bring the carbonaceous substance into a solid state, in order to render grinding thereof possible at ordinary temperature. On the other hand, the drying must not be carried to such an extent that real coking will take place in the mixture, either wholly or partly, as the distribution of the carbonaceous substance in the mixture will then be uneven, which could of course be counteracted by a further grinding or crushing and mixing process but would nevertheless involve considerable cost, besides which the binding properties of the materials would be so reduced as not to permit any pressing of briquettes directly out of the mixture. Thus the drying should not be carried beyond that in which the carbonaceous substance may be brought into a doughy or semi-liquid state at the briquetting temperature.

The accompanying drawing shows in vertical section an electric furnace of the resistance type suited for carrying out the method according to the invention. The electric current is supplied to the furnace by means of one or more electrodes 1 and passes through the slag bath 2 to a bottom contact 3 which in the present case may consist of the metal or metal alloy produced. If a plurality of electrodes are used, the current may preferably be conducted through the slag and the metal between the electrodes, without the use of any bottom electrode. In both cases the temperature necessary for the process is obtained, wholly or partly, on account of the great resistance of the slag.

The briquettes are fed through the stacks 4 provided on each side of the furnace, and are compelled, either manually or by power, preferably applied at the openings 5, to pass through the channels 6 and to spread as far as possible over the entire surface of the slag bath so that the heat of the latter is uniformly distributed to the briquettes supplied, whereby violent gas development and bursting of the briquettes is prevented.

In the run of the melting process it may occur that the slag absorbs part of the carbon which then will carburize the reduced metal at the contact surface between the slag bath and the said reduced metal lying therebeneath. In order to prevent this carburization of the metal and further to prevent unreduced ore particles that may be separated from the briquettes, from entering the metal, the height of the slag bath is adapted in such manner that such ore particles will have ample time for being reduced or absorbed in the slag on their way down through the slag bath.

The gases (carbon monoxide) produced in the run of the process are preferably led off through the feeding stacks, whereby the briquettes are preheated, the said gases being subsequently employed for reducing or heating purposes or the like.

In the following, an illustrative example will be given of the manner in which the invention may be practiced for producing so called rustless iron.

Briquettes were prepared from a mixture of the following composition:

|  | Parts by weight. |
|---|---|
| Iron ore | 60 |
| Chromium ore | 40 |
| Charcoal | 15 |
| Burnt lime | 17 |

A certain quantity of ferro-silicon containing 44% Si and 0.63% C. was added to the charge during each smelting to act as reducing agent together with the charcoal and to avoid trouble with the slag which otherwise will become dry and tough from the high content of magnesia and chromium oxide preventing a satisfactory separating of the produced pure metal from the slag.

Briquettes of the above composition were fed into an electric furnace of the type mentioned above and reduced and melted whilst swimming on a slag bath in same. The products obtained contained 12 to 13% Cr. and about 0.10% C. and were of unusually high quality having a high tenacity and very good workability.

Obviously, the invention is not limited to the construction of furnace above described, in that any suitable furnace of the class above identified may be used for carrying out the process. Nor is the invention limited to the materials or substances enumerated above by way of example, the same, on the contrary, comprising all metals and metal alloys showing a tendency to absorb carbon.

Claims:

1. A method of producing metals and metal alloys low in carbon, consisting in preparing a mixture of finely divided metal ore and finely divided carbonaceous material of such a quantity that the entire quantity of carbon is practically consumed on reduction, transforming said mixture into briquettes so as to bring the substances that are to chemically act upon each other into intimate contact with one another and to prevent the formation of local excesses of the one or other substance, reducing and melting said briquettes in an electric electrode furnace in which heat is developed by electric resistance in the slag bath, with the charge swimming on the slag.

2. A method of producing a ferrochromium alloy low in carbon, consisting in preparing a mixture of finely divided chromic ore and finely divided carbonaceous material of such a quantity that the entire quantity of carbon is practically consumed on reduction, transforming said mixture into briquettes so as to bring the substances that are to chemically act upon each other into intimate contact with one another and to prevent the formation of local excesses of the one or other substance, reducing and melting said briquettes in an electric electrode furnace in which heat is developed by electric resistance in the slag bath, with the charge swimming on the slag.

3. A method of producing metals and metal alloys low in carbon, consisting in preparing a mixture of finely divided metal ore, finely divided carbonaceous material and another reducing agent in a finely divided state, the quantity of carbonaceous material and other reducing agent being so adapted that the entire quantity of carbon is practically consumed on reduction, transforming said mixture into briquettes so as to bring the substances that are to chemically act upon each other into intimate contact with one another and to prevent the formation of local excesses of the one or other substance, reducing and melting said briquettes in an electric electrode furnace in which heat is developed by electric resistance in the slag bath, with the charge swimming on the slag.

4. A method of producing metals and metal alloys low in carbon, consisting in preparing a mixture of finely divided metal ore and finely divided carbonaceous material by mixing the ore with carbonaceous material in a liquid state, the quantity of the carbonaceous material being so adapted that the entire quantity of carbon is practically consumed on reduction, transforming said mixture into briquettes so as to bring the substances that are to chemically act upon each other into intimate contact with one another and to prevent the formation of local excesses of the one or other substances, reducing and melting said briquettes in an electric electrode furnace in which heat is developed by electric resistance in the slag bath, with the charge swimming on the slag.

5. A method of producing metals and metal alloys low in carbon, consisting in preparing a mixture of finely divided metal ore and finely divided carbonaceous material by mixing the ore with carbonaceous material in a liquid state, the quantity of the carbonaceous material being so adapted that the entire quantity of carbon is practically consumed on reduction, subjecting said mixture to drying so as to increase the viscosity of said carbonaceous material, transforming the mixture thus treated into briquettes so as to bring the substances that are to chemically act upon each other into intimate contact with one another and to prevent the formation of local excesses of the one or other substance, reducing and melting said briquettes in an electric electrode furnace in which heat is developed by electric resistance in the slag bath, with the charge swimming on the slag.

6. A method of producing metals and metal alloys low in carbon, consisting in preparing a mixture of finely divided metal ore and finely divided carbonaceous material by mixing the ore with carbonaceous material in a liquid state, the quantity of the carbonaceous material being so adapted that the entire quantity of carbon is practically consumed in reduction, subjecting said mixture to drying so as to increase the viscosity of said carbonaceous material, subjecting the mixture thus treated to a fine crushing process combined with mixing, transforming said latter mixture into briquettes so as to bring the substances that are to chemically act upon each other into intimate contact with one another and to prevent the formation of local excesses of the one or other substance, reducing and melting said briquettes in an electric electrode furnace in which heat is developed by electric resistance in the slag bath, with the charge swimming on the slag.

7. A method of producing metals and metal alloys low in carbon, consisting in preparing a mixture of finely divided metal ore, finely divided carbonaceous material of such a quantity that the entire quantity of carbon is practically consumed on reduction, and additions, transforming said mixture into briquettes so as to bring the substances that are to chemically act upon each other into intimate contact with one another and to prevent the formation of local excesses of the one or other substance, reducing and melting said briquettes in an electric electrode furnace in which heat is developed by electric resistance in the slag bath, with the charge swimming on the slag, said additions being adapted to give said briquettes such a specific gravity that the briquettes are prevented from sinking prior to the reduction, down below the surface of the slag bath.

8. A method of producing metals and metal alloys low in carbon, consisting in preparing a mixture of finely divided metal ore, finely divided carbonaceous material of such a quantity that the entire quantity of carbon is practically consumed on reduction, and additions, transforming said mixture into briquettes so as to bring the substances that are to chemically act upon each other into intimate contact with one another and to prevent the formation of local excesses of the one or other substance, reducing and melting said briquettes in an electric electrode furnace in which heat is developed by electric resistance in the slag bath, with the charge swimming on the slag, said additions being adapted to impart to the slag formed in the process of melting a suitable toughness impeding the sinking down of said briquettes below the surface of the slag bath.

9. A method of producing metals and metal alloys low in carbon, consisting in preparing a mixture of finely divided metal ore and finely divided carbonaceous material of such a quantity that the entire quantity of carbon is practically consumed on reduction, transforming said mixture into briquettes so as to bring the substances that are to chemically act upon each other into intimate contact with one another and to prevent the formation of local excesses of the one or other substance, said briquetting process being carried out at such a pressure that the specific gravity of the briquettes will be lower than that of the slag formed during the melting process, reducing and melting said briquettes in an electric electrode furnace in which heat is developed by electric resistance in the slag bath, with the charge swimming on the slag.

10. A method of producing metals and metal alloys low in carbon, consisting in preparing a mixture of finely divided metal ore, finely divided carbonaceous material and a carbonaceous binding agent, the quantity of said carbonaceous materials being so adapted that the entire quantity of carbon is practically consumed on reduction, transforming said mixture into briquettes so as to bring the substances that are to chemically act upon each other into intimate contact with one another and to prevent the formation of local excesses of the one or other substance, reducing and melting said briquettes in an electric electrode furnace in which heat is developed by electric resistance in the slag bath, with the charge swimming on the slag.

11. A method of producing metals and metal alloys low in carbon, consisting in preparing a mixture of finely divided metal ore and finely divided carbonaceous material of such a quantity that the entire quantity of carbon is practically consumed on reduction, transforming said mixture into briquettes so as to bring the substances that are to chemically act upon each other into intimate contact with one another and to prevent the formation of local excesses of the one or other substance, introducing said briquettes in an electric electrode furnace in which heat is developed by electric resistance in the slag bath in such a way that they are spread practically uniformly over the entire surface of the slag bath, reducing and melting said briquettes in said furnace with the charge swimming on the slag bath.

12. A method of producing metals and metal alloys low in carbon, consisting in preparing a mixture of finely divided metal ore and finely divided carbonaceous material of such a quantity that the entire quantity of carbon is practically consumed on reduction, transforming said mixture into briquettes so as to bring the substances that are to chemically act upon each other into intimate contact with one another and to prevent the formation of local excesses of the one or other substance, reducing and melting said briquettes in an electric electrode furnace in which heat is developed by electric resistance in the slag bath, with the charge swimming on the slag, regulating the height of the slag bath in the furnace in such a manner that unreduced ore particles sinking down will have ample time to be absorbed during their passage through the layer of slag.

In testimony whereof I affix my signature.

GUSTAV HENNING FLODIN.